United States Patent
Severson

(10) Patent No.: US 6,549,365 B1
(45) Date of Patent: Apr. 15, 2003

(54) AIRFLOW CONTROL DEVICE FOR A DISC DRIVE

(75) Inventor: Gregg J. Severson, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/999,701

(22) Filed: Oct. 30, 2001

Related U.S. Application Data

(60) Provisional application No. 60/310,321, filed on Aug. 6, 2001.

(51) Int. Cl.⁷ .............................................. G11B 33/14
(52) U.S. Cl. ................................................. 360/97.02
(58) Field of Search ..................... 360/97.02, 97.01, 360/88, 240, 254.7, 254.8, 254.2, 254, 250

(56) References Cited

U.S. PATENT DOCUMENTS

| | | | |
|---|---|---|---|
| 4,237,503 A | 12/1980 | Ragle | 360/98.02 |
| 4,419,704 A | 12/1983 | Radman et al. | 360/224 |
| 4,823,215 A | 4/1989 | DeMoss et al. | 360/98.02 |
| 5,036,416 A | 7/1991 | Mastache | 360/256.1 |
| 5,134,530 A * | 7/1992 | Hall | 360/128 |
| 5,189,574 A | 2/1993 | Imamura et al. | 360/234.2 |
| 5,631,787 A | 5/1997 | Huang et al. | 360/97.02 |
| 5,663,851 A | 9/1997 | Jeong et al. | 360/98.08 |
| 5,825,576 A * | 10/1998 | Kamerbeek | 360/254.2 |
| 6,064,547 A | 5/2000 | Wittig et al. | 360/98.08 |
| 6,097,568 A | 8/2000 | Ekhoff | 360/97.02 |
| 6,208,484 B1 | 3/2001 | Voights | 360/97.02 |
| 6,266,208 B1 | 7/2001 | Voights | 360/97.02 |
| 2002/0036862 A1 * | 3/2002 | Tsang et al. | 360/97.02 |

FOREIGN PATENT DOCUMENTS

JP          1-144286 A   *  6/1989

* cited by examiner

Primary Examiner—Robert S. Tupper
Assistant Examiner—Julie Anne Watko
(74) Attorney, Agent, or Firm—Fellers, Snider, et al.

(57) ABSTRACT

An airflow control device in a disc drive to remove turbulence from air currents used to aerodynamically support a read/write head adjacent a rotatable disc. The direction of disc rotation is such that a given point on the disc reaches the head prior to reaching an arm used to support the head over a complete revolution of the disc. The airflow control device is placed upstream from the head and forms a channel within which the head moves across the disc. The airflow control device includes a diverter member upstream from the head and a screen member which extends over the head. During operation, air currents impinge upon the diverter member and most of these currents are diverted away from the head. A small portion of the air currents passes through a gap between the diverter member and the disc and flows on to the head to support the head.

20 Claims, 6 Drawing Sheets

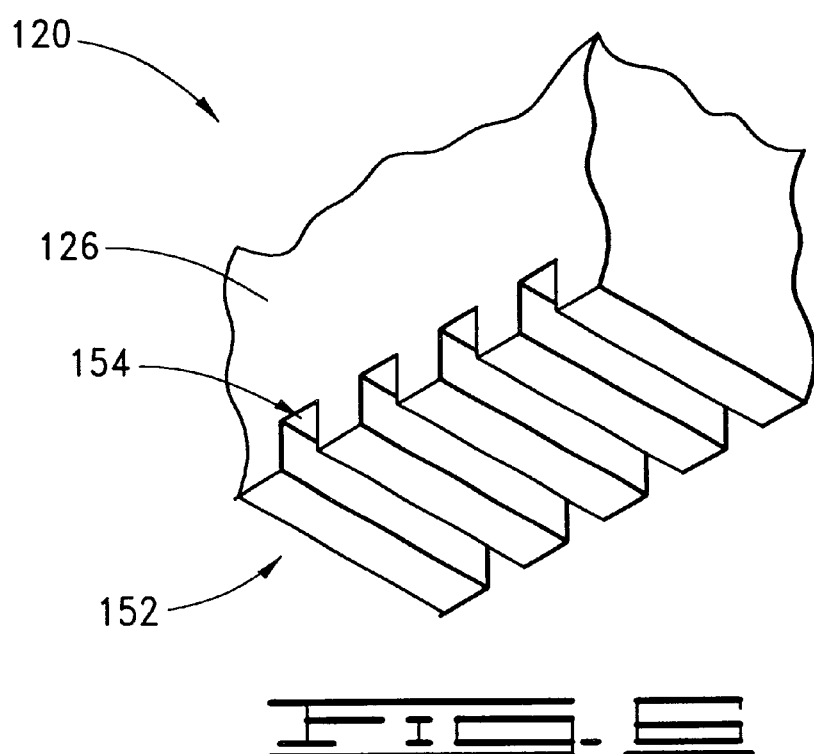
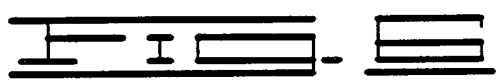
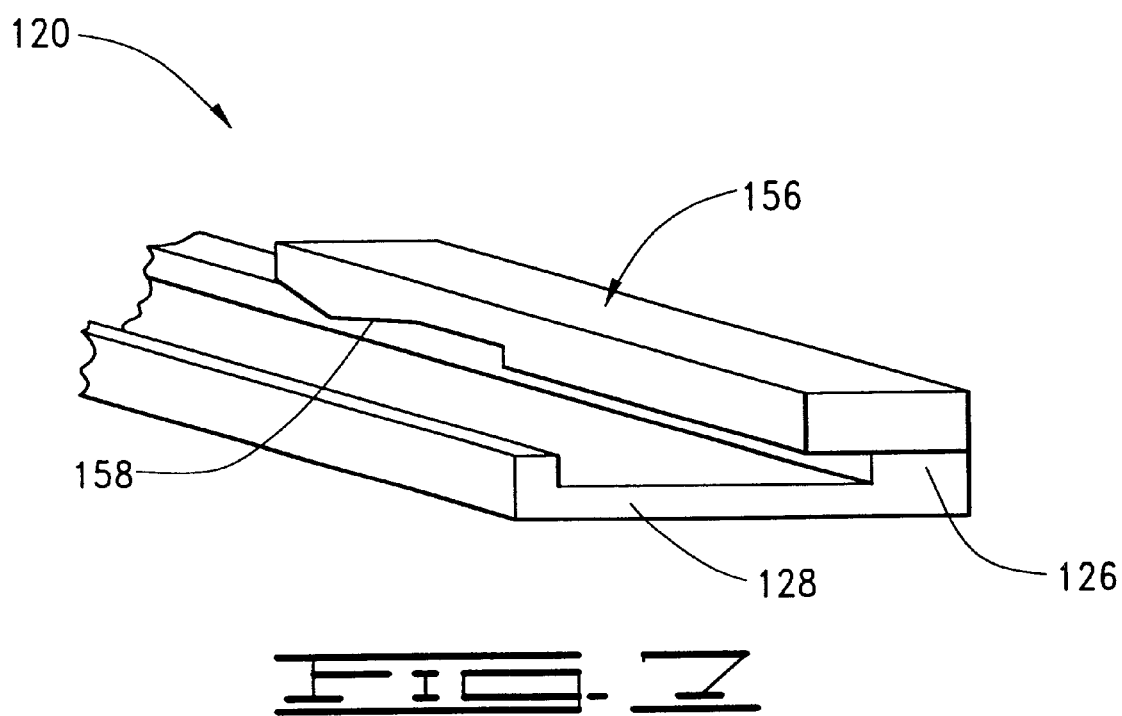
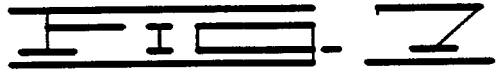

AIRFLOW CONTROL DEVICE FOR A DISC DRIVE

RELATED APPLICATIONS

This application claims the benefit of United States Provisional Application No. 60/310,321 filed Aug. 6, 2001.

FIELD OF THE INVENTION

The claimed invention relates generally to the field of disc drive data storage devices, and more particularly but not by way of limitation, to a disc drive having a controllably positionable head adjacent a rotatable disc and an airflow control device which extends along the path of travel of the head to reduce and direct air flow generated by rotation of the disc.

BACKGROUND

Modern disc drives are commonly used in a multitude of computer environments to store large amounts of data in a form that is readily available to an end user. A typical disc drive has one or more rigid magnetic recording discs that are rotated by a spindle motor at a constant high speed.

Each disc has a data storage surface divided into a series of generally concentric data tracks radially spaced across a band having an inner diameter and an outer diameter. Data are stored within the data tracks on the disc surfaces in the form of magnetic flux transitions. The flux transitions are induced by an array of read/write heads. Each data track is divided into a number of data sectors where data are stored in fixed size data blocks.

The read/write heads are supported by flexible suspension assemblies which in turn are supported by rigid actuator arms that project into the disc stack. Each head includes an air bearing surface that, in response to air currents caused by rotation of the disc, causes the head to fly adjacent to the disc surface.

A continuing trend in the industry is the simultaneous reduction in size and increase in data storage capacity and processing speed of modern disc drives. Such improvements have been brought about through a variety of changes in the configurations of the drives, including the use of higher disc rotational speeds. While advantageously reducing latency times (i.e., time spent waiting for a selected data block to reach the head as a particular disc rotates), higher rotational speeds tend to induce a greater degree of turbulence in the airflow established by the rotating discs.

Airflow turbulence is characterized by random fluctuations in the speed and direction of the airflow. Such airflow turbulence can cause unwanted vibration of the discs and heads, leading to undesired head position (run-out) error during operation. Accordingly, a need exists within the art to reduce airflow turbulence near a disc drive head to reduce run-out errors in the drive.

SUMMARY OF THE INVENTION

In accordance with preferred embodiments, a disc drive includes a rotatable disc having a disc recording surface configured for rotation in a selected rotational direction. A rotatable actuator is provided adjacent the disc and comprises an arm and a head supported by the arm.

The head is configured to be aerodynamically supported in close proximity to the disc recording surface by air currents generated by rotation of the disc. The rotational direction of the disc is selected so that a given point on the disc that initially starts at a location 180 degrees away from the head will pass the head prior to passing the arm over a complete rotation of the disc.

A stationary airflow control device is disposed upstream of and in close proximity to the head. The airflow control device comprises a diverter member and a screen member which cooperatively form a radially extending channel. The head moves within the channel along an arcuate path of travel across the disc recording surface.

Air currents established by rotation of the disc impinge upon the diverter member. Most of this volume of airflow is diverted away from the head and either passes along the diverter member to the innermost or outermost radii of the disc, or up and over the screen member. However, a small portion of the air currents passes through a gap between the diverter member and the disc recording surface. These air currents have a substantially laminar flow and are used to aerodynamically support the head.

In a preferred embodiment, the disc drive comprises a housing which encloses the disc and the actuator, and the airflow control device is incorporated as part of the housing. This configuration is particularly suited for disc drives having a single disc and for the topmost and bottommost discs in a disc drive having multiple discs. In another preferred embodiment, the airflow control device is disposed between a pair of adjacent discs and has a generally t-shaped cross section to form a pair of channels each shielding a separate head between the discs.

A back-screen preferably projects from a distal edge of the screen member to restrict back-flow of the air currents passing over the exterior surface of the screen member into the channel. A ramp load member is advantageously affixed to the diverter member to secure the head when the disc is in a nonrotational state.

These and various other features and advantages which characterize the claimed invention will be apparent upon reading the following detailed description and upon review of the associated drawings.

BRIEF DESCRIPTION OF THE DRAWINGS

FIG. 6 is an isometric view of a portion of the airflow control device of FIG. 2 to illustrate a number of grooves established in a disc facing edge of the airflow control device to induce laminar flow in the air currents that reach the head.

FIG. 7 is an isometric view of an airflow control device in accordance with another preferred embodiment, with the airflow control device of FIG. 7 having a ramp load member used to secure the head when the disc is in a nonrotational state.

DETAILED DESCRIPTION

Figure 1:
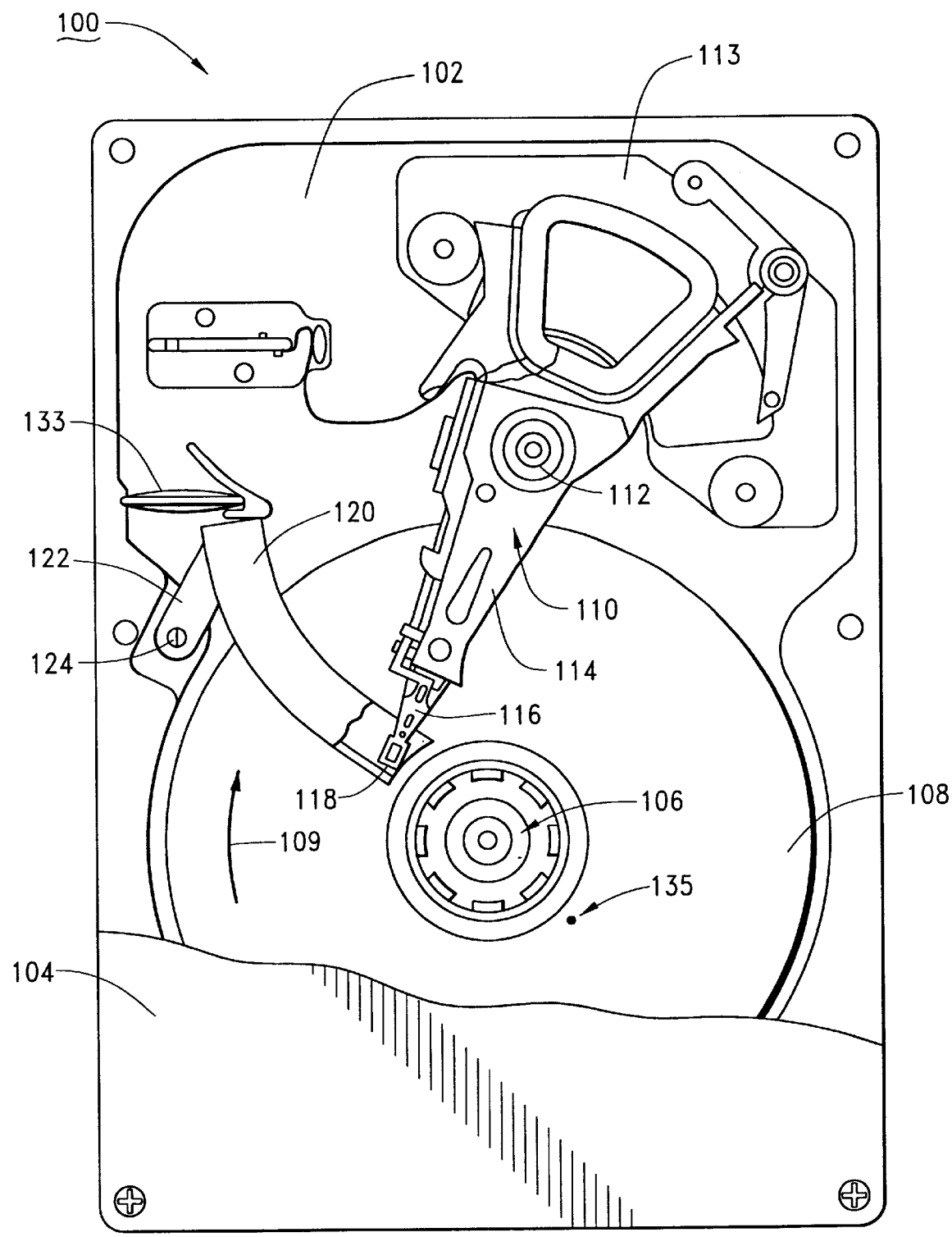
FIG. 1 is a plan view of a disc drive incorporating an airflow control device constructed in accordance with preferred embodiments of the present invention.

Referring to the drawings in general, and more particularly to FIG. 1, shown therein is a plan view of a disc drive 100 constructed in accordance with preferred embodiments of the present invention. The disc drive 100 includes a base deck 102 and a top cover 104 (shown in partial cutaway) which cooperate to form a housing for the disc drive to enclose various disc drive components within an interior environment.

A spindle motor 106 rotates a number of rigid magnetic recording discs 108 in a rotational direction indicated at 109. The significance of this rotational configuration of the spindle motor 100 will be discussed below.

Continuing with FIG. 1, a rotatable actuator 110 is provided adjacent the discs 108 and rotates about a cartridge bearing assembly 112 through application of currents to an actuator motor 113 (voice coil motor, VCM). The actuator 110 includes a number of rigid actuator arms 114 which project out over the corresponding disc recording surfaces. Flexible suspension assemblies 116 (flexures) project from the distal ends of the arms 114 to support a corresponding number of read/write heads 118. The heads are aerodynamically supported by air currents established by rotation of the discs 108. It will be noted that these air currents substantially flow in the direction of disc rotation indicated at 109.

Each head 118 is shrouded within a corresponding stationary airflow control device 120. Only the topmost airflow control device 120 is shown in FIG. 1. The topmost airflow control device of FIG. 1 is shown in partial cutaway to reveal the topmost head 118. The airflow control device 120 is secured relative to the head 118 in a suitable manner, such as to the basedeck 102 via support 122 and fastener 124.

Figure 2:
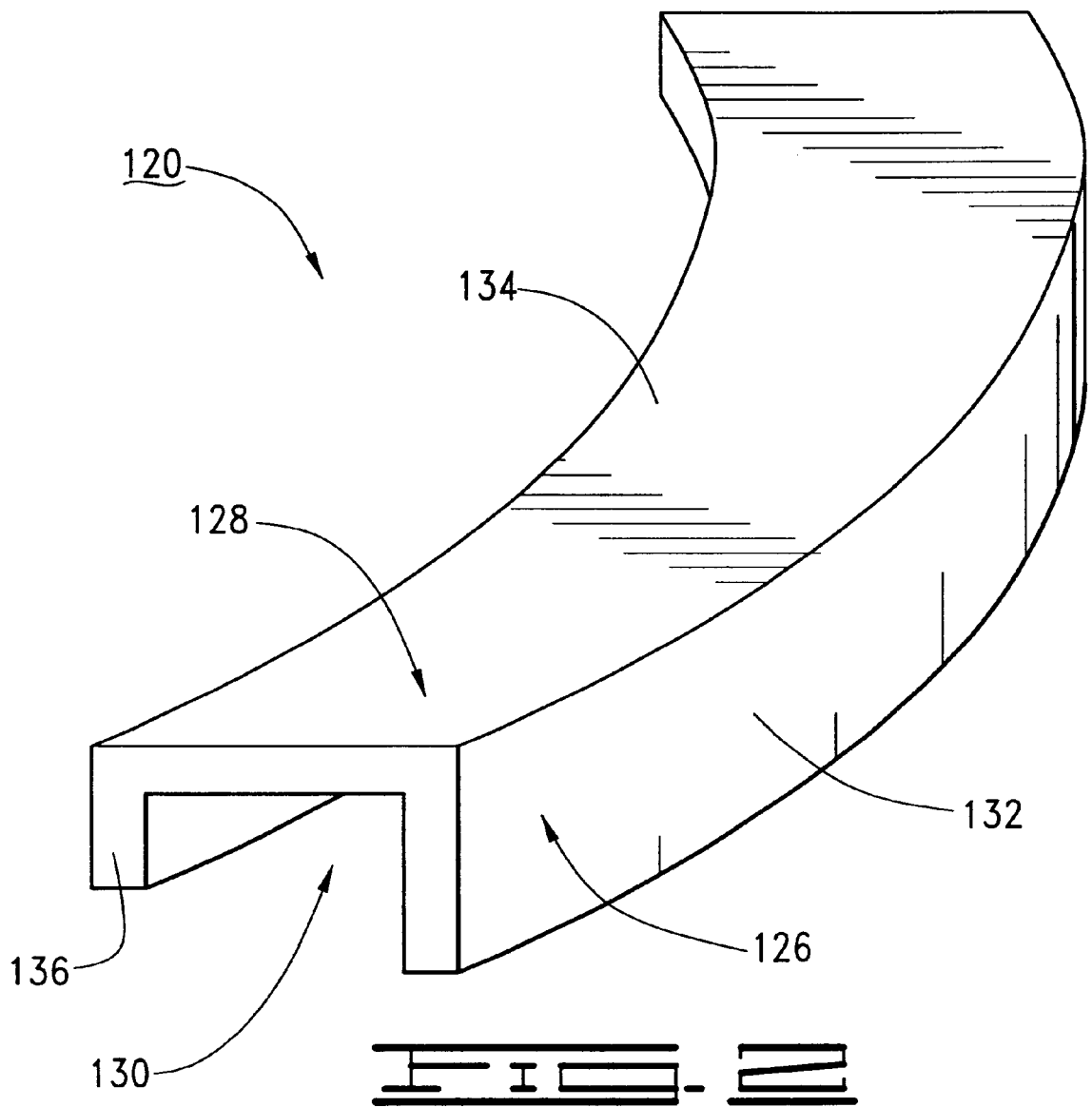
FIG. 2 is an isometric view of the airflow control device of FIG. 1.
Figure 3:
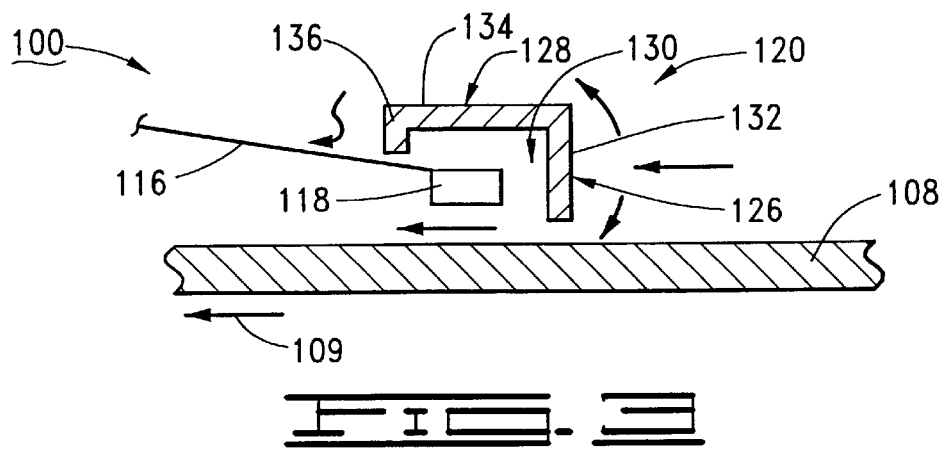
FIG. 3 is a cross-sectional, elevational view of the airflow control device in accordance with the embodiment of FIG. 2 in conjunction with a read/write head and a disc.

FIGS. 2 and 3 show the airflow control device 120 of FIG. 1 in greater detail. With respect to FIG. 3, it will be noted that the relative positions of the head 118 with respect to the disc 108 and the airflow control device 120, as well as the relative dimensions of the disc 108, the head 118 and the airflow control device 120, are shown schematically and are thus not necessarily intended to be drawn to scale.

The airflow control device 120 includes a diverter member 126 and a screen member 128. These members cooperatively form a channel 130 to accommodate movement of the head 118 along an arcuate path of travel across the corresponding disc surface. Although the diverter member 126 is shown as being substantially perpendicular to the screen member 128, it is contemplated that the diverter member 126 and the screen member 128 can take a variety of configurations, such as by forming an angle other than ninety degrees with one another, by forming a continuously curved surface, etc. The respective dimensions of the diverter member 126 and the screen member 128 can vary and are preferably selected based upon a number of factors including available clearance within the drive.

The airflow control device 120 operates to divert a substantial portion of the air currents generated by rotation of the discs 108 away from the head 118 and to establish a laminar flow in the remaining portion of the air currents adjacent the head 118. More specifically, during operation the air currents initially encounter and impinge upon the diverter member 126. The diverter member 126 directs most of the air currents to flow laterally along an exterior surface 132 of the diverter member 126 to the innermost and/or the outermost radii of the disc 108, and up and over an exterior surface 134 of the screen member 128. Airflow directed to the outermost radii of the discs 108 can be advantageously directed through a desiccant filter 133, as desired.

Some of the air currents, however, pass through a gap (not numerically designated) between the diverter member 126 and the disc 108. These air currents will have a substantially lower volume and velocity as compared to the initial air currents. The gap is selectively configured to provide a substantially laminar flow at the head 118.

It will be noted that the direction of the air currents in FIG. 1 is opposite that typically used in prior art disc drives; that is, prior art disc drives typically rotate the discs in a direction opposite that shown by arrow 109. This prior art configuration results in the air currents passing over the arms 114 and flexures 116 prior to reaching the heads 118, which tends to induce turbulence in the air currents that finally reach the heads 118. By reversing the rotational configuration of the spindle motor 106, turbulence at the head 118 induced by the arm 1 14 and flexure 116 is substantially eliminated.

Because of this change in disc rotational direction, it will generally be necessary to change the aerodynamic characteristics of the heads 118 to "fly" in this opposite rotational direction. It also may be necessary to adjust the head aerodynamic characteristics to account for the reduced airflow provided by the airflow control device 120. Such configuration adjustments are well within the ability of those skilled in the art to implement and will thus not be further discussed herein.

Because the placement and the angle of the actuator arms and heads can vary based on the configuration of the drive, it may be helpful to give a more generalized characterization of the rotational direction of the discs with respect to the heads and actuator arms when implementing the airflow control device. The direction of disc rotation is selected so that a given point (shown at 135 in FIG. 1) on the disc 108 that initially starts at a location 180 degrees (one-half a rotation) away from the head 118 will pass the head 118 prior to passing the associated arm 114 during a complete revolution of the discs 108.

Thus, while the direction of disc rotation 109 shown in FIG. 1 is clockwise, the foregoing definition shows that the discs should be rotated in a counter-clockwise direction if the configuration of FIG. 1 were mirrored (i.e., if the VCM 113 was alternatively placed in the upper left hand quadrant of the drive and the heads were projected down and to the right).

Continuing with the airflow control device 120 as embodied in FIGS. 2 and 3, it will be noted that a back-screen member 136 projects from a distal edge of the screen member 128 in a direction toward the head 118. The back-screen member 136 operates to reduce back-flow of air currents passing over the exterior surface 134 of the screen member 128 into the channel 130. Although not shown in FIGS. 2–3, it will be understood that side screens can be advantageously provided as desired at the innermost and/or outermost extents of the airflow control device to seal off the channel 130 to further control the flow of the air currents within the channel 130.

Figure 4:
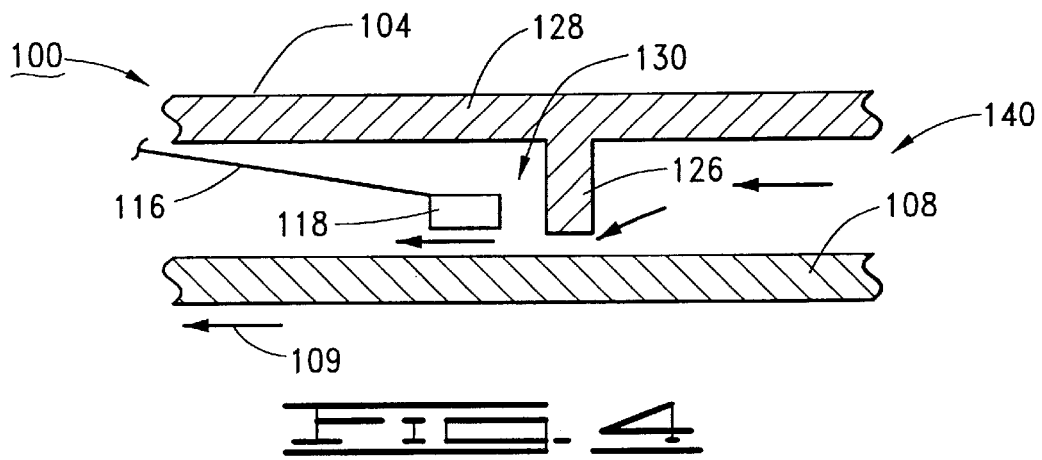
FIG. 4 is a cross-sectional, elevational view of the airflow control device in accordance with another preferred embodiment in which the airflow control device is formed as part of a housing of the disc drive.

Another embodiment for an airflow control device is shown in FIG. 4. This embodiment is numerically designated at 140. In this embodiment, the screen member 128 is incorporated as part of the disc drive housing (e.g., the top cover 104). The diverter member 126 projects from the housing as shown. A small portion of the air currents pass between the diverter member 126 and the disc 108. The remainder of the air currents flow laterally across the diverter member 126 toward the innermost and/or outermost radii of the disc 108. The airflow control device 140 of FIG. 4 is particularly well suited for a disc drive having a single disc, as well as for the topmost and bottommost discs in a disc drive having multiple discs.

Figure 5:
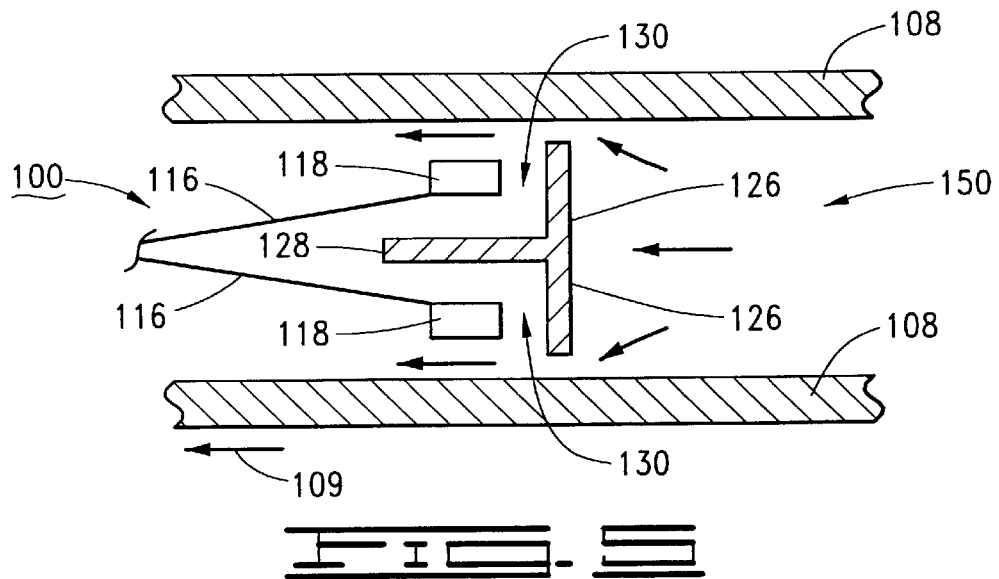
FIG. 5 is a cross-sectional, elevational view of the airflow control device in accordance with another preferred embodiment, with the embodiment of FIG. 5 configured for placement between adjacent discs to shield two adjacent heads.

FIG. 5 illustrates another embodiment of an airflow control device suitable for use between a pair of adjacent discs 108. The airflow control device in FIG. 5 is numerically designated at 150 and includes a pair of diverter members 126 which are aligned and connected to the screen member 128 to form a generally T-shaped cross section. In this way, a pair of channels 130 are respectively formed for a pair of adjacent heads 118 disposed adjacent facing disc recording surfaces.

FIG. 6 shows a partial view of a disc facing edge 152 of the diverter member 126. The disc facing edge 152 incorporates a plurality of grooves 154 which substantially extend in the direction of rotation when the airflow control device is installed in the disc drive 100. The size and number of grooves 154 are selected as desired to impart laminar flow to the air currents passing between the diverter member 126 and the associated disc 108. The grooves 154 are formed using a suitable process such as laser etching.

FIG. 7 shows yet another embodiment of the airflow control device 120 of FIGS. 1–3 having a ramp load member 156 disposed on the diverter member 126. The ramp load member 156 can be a separately fabricated piece that is subsequently affixed to the diverter member 126, or can be formed as a portion of the diverter member 126. The ramp load member 156 provides a ramp load surface 158 to support the head 118 when the discs 108 are in a nonrotational state. The ramp load members 156 can be positioned near the innermost or outermost radii of the discs 108, as desired.

Figure 8:
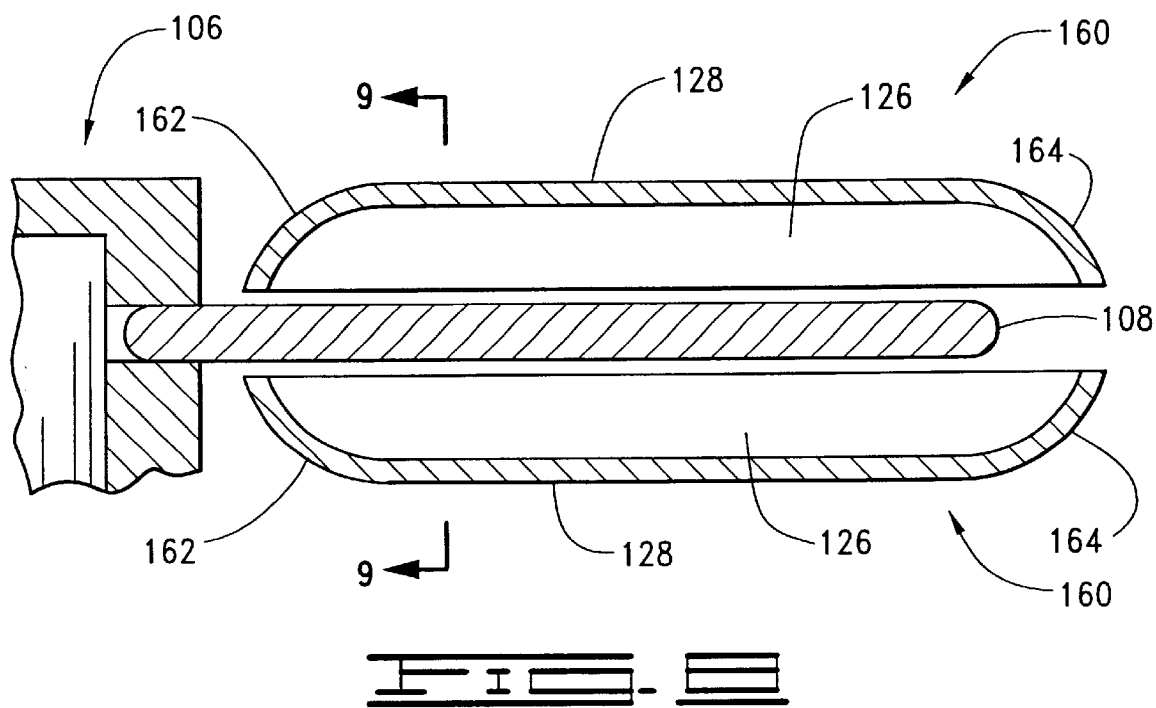
FIG. 8 is a cross-sectional, elevational view of the airflow control device and the spindle motor hub in accordance with another preferred embodiment.
Figure 9:
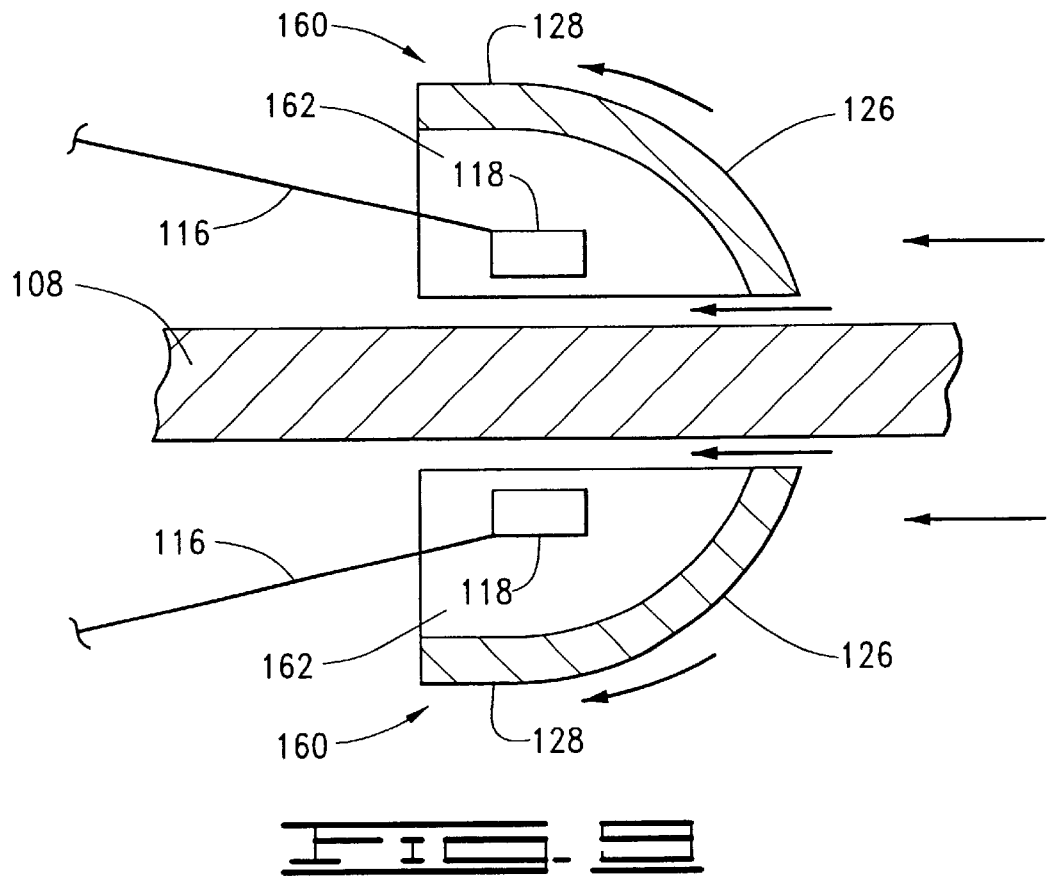
FIG. 9 is a cross-sectional view of section 9—9 shown in FIG. 8.

FIGS. 8 and 9 depict another embodiment of the present invention, showing airflow control devices 160 positioned above and below a selected disc 108. For clarity, the corresponding heads 118 are not shown in FIG. 8. The disc 108 is secured for rotation about the spindle motor 106 as shown.

Each airflow control device 160 has an inner wall 162 (adjacent the spindle motor 106) and an outer wall 164 (adjacent the outermost radius of the disc 108) to further shield the head 118 from undesired turbulence. There is a space between the rotating hub 106 and the inner wall 162 of the airflow control device 160, as shown. The inner wall 162 shields the head 118 from wind effects caused by the spindle motor 106. Likewise, the outer end wall 164 shields the head 118 from wind effects caused by airflow interacting with the housing.

As shown in FIG. 9, the diverter member 126 and the screen member 128 are not discontinuous pieces, but are rather curvilinearly shaped to provide a curved surface to the impinging air currents. Each of the end walls 162 and 164 are contoured with the diverter member 126 and the screen member 128 to avoid sharp compression corners and expansion corners in the flow field, as sharp corners can cause boundary layer separation and flow instabilities.

Figure 10:
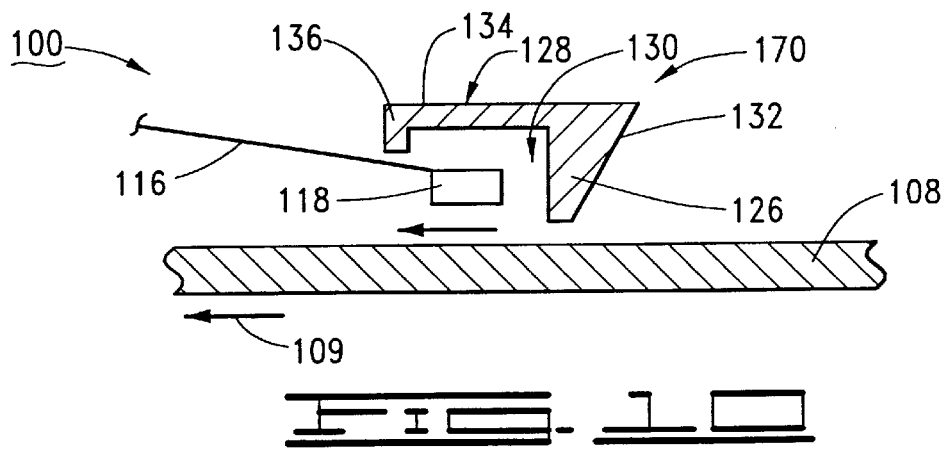
FIG. 10 is a cross-sectional, elevational view of the airflow control device in accordance with another preferred embodiment.
Figure 11:
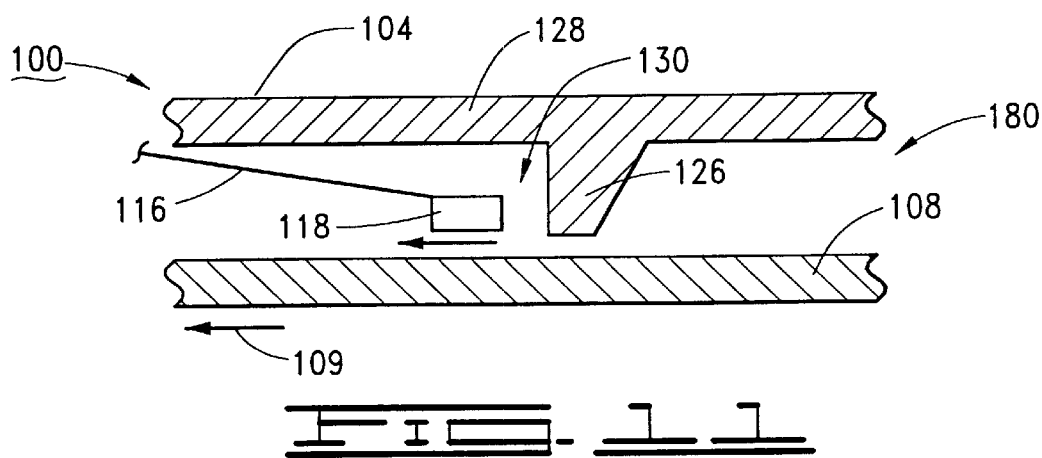
FIG. 11 is a cross-sectional, elevational view of the airflow control device in accordance with another preferred embodiment in which the airflow control device is formed as part of a housing of the disc drive.
Figure 12:
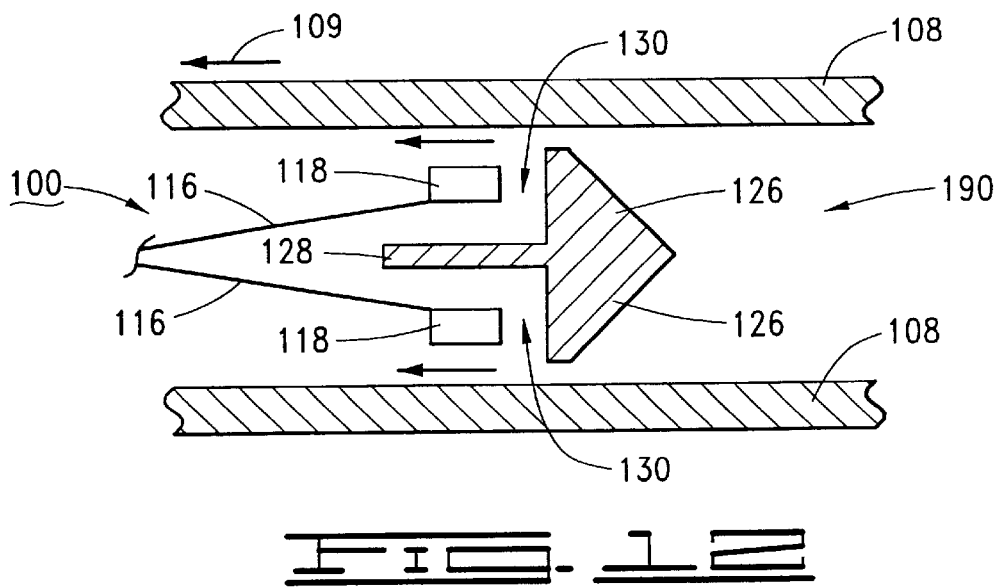
FIG. 12 is a cross-sectional, elevational view of the airflow control device in accordance with another preferred embodiment, with the embodiment of FIG. 12 configured for placement between adjacent discs to shield two adjacent heads.

FIG. 10 depicts another embodiment of an airflow control device 170 that is similar to the embodiment shown in FIG. 3. However, the device 170 in FIG. 10 provides a diverter member 126 that is substantially trapezoidal in shape. FIG. 11 shows another embodiment of an airflow control device 180 similar to the embodiment shown in FIG. 4, as with the embodiment of FIG. 10, the embodiment of FIG. 11 also has a trapezoidally shaped diverter member 126. FIG. 12 shows yet another embodiment of an airflow control device 190 similar to the embodiment shown in FIG. 5. However, instead of providing a substantially blunt edge to the air currents, the device 190 in FIG. 12 is substantially wedge-shaped.

Accordingly, it will now be understood that the present invention (as disclosed herein and as claimed below) is generally directed to a stationary airflow control device for use in a disc drive. In accordance with preferred embodiments, a disc drive (such as 100) includes a rotatable disc (such as 108) having a disc recording surface configured for rotation in a selected rotational direction (such as 109), said rotation establishing air currents which flow in the selected rotational direction. A rotatable actuator (such as 110) is provided adjacent the disc and comprises an arm (such as 114) and a head (such as 118) supported by the arm. The head is configured to be aerodynamically supported in close proximity to the disc recording surface by the air currents. The direction of rotation of the disc is selected so that a given point (such as 135) on the disc that initially starts at a location 180 degrees away from the head will pass the head prior to passing the arm over a complete rotation of the disc.

A stationary airflow control device (such as 120, 140, 150, 160, 170, 180, 190) comprises a diverter member (such as 126) and a screen member (such as 128) which extends from the diverter member. The diverter member is disposed upstream from the head opposite the arm so that the head is disposed between the diverter member and the arm, and the screen member is disposed adjacent the head so that the head is disposed between the screen member and the disc recording surface.

The diverter member and the screen member cooperatively form a radially extending channel (such as 130) within which the head moves along an arcuate path of travel as the head is moved across the disc recording surface. Air currents established by rotation of the disc impinge upon the diverter member so that a first portion of said air currents passes through a gap between the diverter member and the disc recording surface to aerodynamically support the head and a second, remaining portion of said air currents are diverted away from the head.

In a preferred embodiment, the disc drive further comprises a housing (such as 102, 104) which encloses the disc, the actuator and the stationary airflow control device within an interior environment, and the screen member forms a portion of the housing. In another preferred embodiment, the screen member is separate from the housing so that air currents pass over an exterior surface (such as 134) of the screen member.

A back-screen (such as 136) preferably projects from a distal edge of the screen member to restrict back-flow of the air currents passing over the exterior surface of the screen member into the channel. A ramp load member (such as 156) is preferably affixed to the diverter member to secure the head when the disc is in a nonrotational state.

For purposes of the appended claims, it will be understood that the airflow control devices embodied at 120, 140, 150, 160, 170, 180 and 190 carry out the recited function of the claimed "first means" of "diverting a substantial portion of the air currents away from the head and for establishing laminar flow in a remaining portion of the air currents adjacent the head".

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application for the airflow control device while maintaining the same functionality without departing from the spirit and scope of the present invention.

In addition, although the embodiments described herein are directed to an airflow control device for a disc drive, it will be appreciated by those skilled in the art that the airflow control device can be used to reduce turbulence in other systems without departing from the spirit and scope of the claimed invention.

What is claimed is:

1. A stationary airflow control device configured for use in a disc drive comprising a rotatable disc having a disc recording surface and a head moved adjacent the disc recording surface by an arm of a rotatable actuator, the head aerodynamically supported over the disc recording surface by air currents established by and which generally flow in a direction of rotation of the disc, the direction of rotation selected so that a given point on the disc that initially starts at a location 180 degrees away from the head will pass the head prior to passing the arm over a complete rotation of the disc, the airflow control device comprising:

a diverter member disposed upstream from the head opposite the arm so that the head is disposed between the diverter member and the arm; and a screen member which extends from the diverter member adjacent the head so that the head is disposed between the screen member and the disc recording surface, wherein the diverter member and the screen member cooperatively form a channel which extends across a radius of the disc recording surface so that the head moves along an arcuate path of travel within said channel, and wherein air currents established by rotation of the disc impinge upon the diverter member so that a first portion of said air currents passes through a gap between the diverter member and the disc recording surface to aerodynamically support the head and a second, remaining portion of said air currents are diverted away from the head.

2. The airflow control device of claim 1, wherein the screen member composes a portion of a housing of the disc drive, the housing enclosing the disc, the head, the actuator and the airflow control device in an interior environment.

3. The airflow control device of claim 1, wherein the second, remaining portion of said air currents diverted away from the head comprise a third portion and a fourth portion, wherein the third portion of the air currents are diverted along an exterior surface of the diverter member opposite the channel, and the fourth portion of the air currents pass across an exterior surface of the screen member opposite the channel.

4. The airflow control device of claim 3, wherein the screen member comprises a distal edge opposite the diverter member, and wherein the airflow control device further comprises a back-screen member which projects from the distal edge of the screen member in a direction toward the head to limit flow of the fourth portion of the air currents into the channel.

5. The airflow control device of claim 1, further comprising a ramp load member affixed to the diverter member to secure the head when the disc is in a nonrotational state.

6. The airflow control device of claim 5, wherein the ramp load member is positioned adjacent an outermost radius of the disc.

7. The airflow control device of claim 5, wherein the ramp load member is positioned adjacent an innermost radius of the disc.

8. The airflow control device of claim 1, wherein the diverter m ember comprises a disc facing edge adjacent the disc recording surface so that the gap through which the first portion of the air currents flows is established by the disc facing edge and the disc recording surface, and wherein the disc facing edge is contoured with a series of grooves which generally extend in the direction of rotation of the disc to induce laminar flow in the first portion of the air currents.

9. The airflow control device of claim 1 further comprising an inner end wall to shield the head from wind effects caused by the spindle motor.

10. The airflow control device of claim 1 further comprising an outer end wall to shield the head from edge effects caused by the flow interacting with a housing.

11. A disc drive, comprising:

a rotatable disc having a disc recording surface configured for rotation in a selected rotational direction, said rotation establishing air currents which flow in the selected rotational direction;

a rotatable actuator adjacent the disc and comprising an arm and a head supported by the arm, the head configured to be aerodynamically supported in close proximity to the disc recording surface by the air currents, wherein the rotational direction of the disc is selected so that a given point on the disc that initially starts at a location 180 degrees away from the head will pass the head prior to passing the arm over a complete rotation of the disc; and a stationary airflow control device comprising a diverter member and a screen member which extends from the diverter member, wherein the diverter member is disposed upstream from the head opposite the arm so that the head is disposed between the diverter member and the arm, wherein the screen member is disposed adjacent the head so that the head is disposed between the screen member and the disc recording surface, wherein the diverter member and the screen member cooperatively form a radially extending channel within which the head moves along an arcuate path of travel as the head is moved across the disc recording surface, and wherein air currents established by rotation of the disc impinge upon the diverter member so that a first portion of said air currents passes through a gap between the diverter member and the disc recording surface to aerodynamically support the head and a second, remaining portion of said air currents are diverted away from the head.

12. The disc drive of claim 11, further comprising a housing which encloses the disc, the actuator and the stationary airflow control device within an interior environment, wherein the screen member forms a portion of the housing.

13. The disc drive of claim 11, further comprising a ramp load member affixed to the diverter member to secure the head when the disc is in a nonrotational state.

14. The disc drive of claim 11, wherein the diverter member comprises a disc facing edge adjacent the disc recording surface so that the gap through which the first portion of the air currents flows is established by the disc facing edge and the disc recording surface, and wherein the disc facing edge is contoured with a series of grooves which generally extend in the direction of rotation of the disc to induce laminar flow in the first portion of the air currents.

15. The disc drive of claim 11, wherein the disc, the disc recording surface, the head, the diverter member and the channel are respectively characterized as a first disc, a first disc recording surface, a first head, a first diverter member and a first channel, wherein the disc drive further comprises a second disc having a second disc recording surface and a second head adjacent the second disc recording surface, the second disc axially aligned with the first disc so that the first and second heads are disposed between the first and second discs, and wherein the airflow control device further comprises:

a second diverter member aligned with the first diverter member and connected to the screen member so that the second diverter member and the screen member form a second radially extending channel within which the second head moves along an arcuate path of travel, wherein air currents established by the combined rotation of the first and second discs impinge upon the second diverter member so that another portion of the air currents passes between the second diverter member and the second disc recording surface to aerodynamically support the second head.

16. A disc drive, comprising:

a rotatable disc having a disc recording surface configured for rotation in a selected rotational direction, said rotation establishing air currents which flow in the selected rotational direction;

a rotatable actuator adjacent the disc and comprising an arm and a head supported by the arm, the head configured to be aerodynamically supported in close proximity to the disc recording surface by said air currents, wherein the rotational direction of the disc is selected so that a given point on the disc that initially starts at a location 180 degrees away from the head will pass the head prior to passing the arm over a complete rotation of the disc; and first means upstream from the head for diverting a substantial portion of the air currents away from the head and for establishing laminar flow in a remaining portion of the air currents adjacent the head.

17. The disc drive of claim 16, wherein the first means comprises a stationary airflow control device comprising a diverter member and a screen member which extends from the diverter member, wherein the diverter member is disposed upstream from the head opposite the arm so that the head is disposed between the diverter member and the arm, wherein the screen member is disposed adjacent the head so that the head is disposed between the screen member and the disc recording surface, wherein the diverter member and the screen member cooperatively form a radially extending channel within which the head moves along an arcuate path of travel as the head is moved across the disc recording surface, and wherein the substantial portion of the air currents are deflected away from the head by the diverter member and the remaining portion of the air currents pass between the diverter member and the disc recording surface to the head.

18. The disc drive of claim 17, further comprising a housing which encloses the disc, the actuator and the stationary airflow control device within an interior environment, wherein the screen member forms a portion of the housing.

19. The disc drive of claim 17, wherein the airflow control device further comprises a ramp load member affixed to the diverter member to secure the head when the disc is in a nonrotational state.

20. The disc drive of claim 17, wherein the diverter member comprises a disc facing edge adjacent the disc recording surface so that the remaining portion of the air currents flow through a gap between the disc facing edge and the disc recording surface, and wherein the disc facing edge is contoured with a series of grooves which generally extend in the direction of rotation of the disc to induce laminar flow in the remaining portion of the air currents.

* * * * *